United States Patent [19]

Conrad

[11] 4,179,599
[45] Dec. 18, 1979

[54] LASER PLASMATRON

[75] Inventor: Raymond W. Conrad, Russellville, Ala.

[73] Assignee: The United States of America as represented by the Secretary of the Army, Washington, D.C.

[21] Appl. No.: 903,417

[22] Filed: May 8, 1978

[51] Int. Cl.² .............................................. B23K 9/00
[52] U.S. Cl. ............................ 219/121 P; 219/121 L; 176/1; 313/231.3; 315/111.7
[58] Field of Search ........... 219/121 P, 121 R, 121 L, 219/121 LM; 331/94.5; 313/231.4, 231.3; 315/111.7, 111.2; 176/1

[56] References Cited

U.S. PATENT DOCUMENTS

| 3,756,344 | 9/1973 | Daiber et al. ............................ 176/1 |
| 3,872,279 | 3/1975 | Fairbairn .......................... 219/121 L |
| 3,935,504 | 2/1976 | Guillaneux et al. ..................... 176/1 |
| 4,042,325 | 8/1977 | Tensmeyer ................... 219/121 LM |
| 4,091,256 | 5/1978 | Früchtericht .................... 219/121 P |

OTHER PUBLICATIONS

"Experimental Study of a Laser Sustained Air Plasma", pp. 1080–1083 of American Inst. of Physics, 3–1975—by Keefer.

"Cutting and Welding with CO₂ Laser", 9–1969, Metal Forming, pp. 258–260.

*Primary Examiner*—Bruce A. Reynolds
*Assistant Examiner*—M. H. Paschall
*Attorney, Agent, or Firm*—Nathan Edelberg; Robert P. Gibson; Freddie M. Bush

[57] ABSTRACT

Plasma generation occurs when radiation from a high power, infrared laser is directed to a sufficiently short focal point to produce the irradiance required for producing a plasma or laser-supported combustion wave, with the assistance of external plasma initiation apparatus such as an electrode discharge. The laser beam is directed through a cylindrical or conical chamber to the electrode discharge means. The chamber allows a controlled flow of gas to be introduced into the chamber, flowing in the direction of the laser beam to exhaust at the end of the chamber. A plasma is ignited, using the plasma initiation device and is prevented from propagating up the laser beam by the opposing flow of gas. The position of the plasma along the laser beam axis and the plasma temperature are controlled by the velocity of the gas flow. As the gas velocity is increased, the plasma is forced to retreat into higher intensity regions of the converging laser beam, where it absorbs more energy from the beam thereby reaching higher temperatures.

5 Claims, 1 Drawing Figure

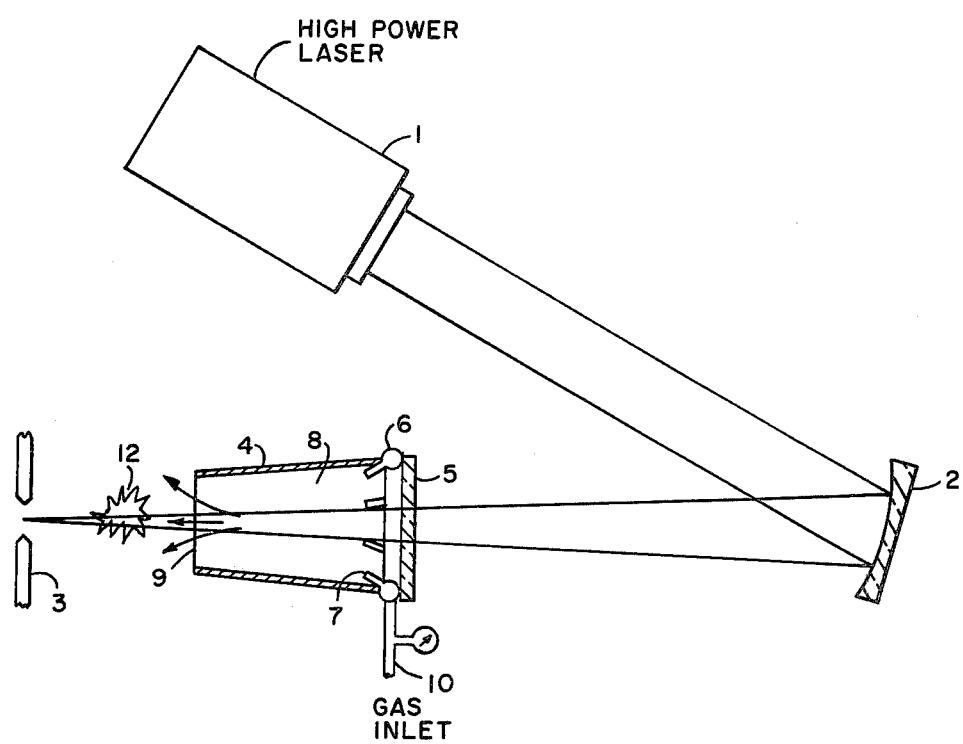

LASER PLASMATRON

DEDICATORY CLAUSE

The invention described herein may be manufactured, used, and licensed by or for the Government for governmental purposes without the payment to me of any royalties thereon.

BACKGROUND OF THE INVENTION

Plasmatrons or plasma generators producing high temperature and density plasmas are used in a variety of industrial and laboratory applications, such as plasma torches for flame-spraying refractory materials, sources of continium radiation and as a medium for carrying out exotic chemical reactions. Techniques presently employed to produce continuous plasmas consist of very high current electric arcs, high power radio-frequency or microwave discharges, and very highly focused, high power continuous wave lasers. Short pulse length plasmas are commonly produced by high power pulsed lasers. The electric arc and the high frequency discharge technique for producing continuous plasmas suffer from the disadvantage of having some type of solid material in close proximity to the plasma. This material is subjected to intense radiant and convective heating, and may erode or otherwise degrade at a rapid rate, leading to chemical contamination of the plasma. Other disadvantages are the presence of large, stray fields of rf energy in the case of the rf generated plasma, and limited plasma temperature for both methods. The use of a highly focused, cw (continuous wave) laser to maintain a plasma, after ignition suffers from the disadvantage that the plasma tends to propagate away from the higher intensity regions of the focused beam, and stabilize at a location where the radiation intensity is the minimum required for plasma maintenance. This plasma migration to a relatively low intensity region results in a very much reduced plasma temperature. Additionally, the absorption of the laser radiation by the plasma is also reduced leading to an inefficient utilization of laser energy.

SUMMARY OF THE INVENTION

A laser plasmatron utilizes radiation from a high power laser to provide a continuous plasma generator which produces controlled plasma temperatures through controlling the position of the plasma by the velocity of a gas flowing in opposition to the direction of movement of the plasma. Radiation from a high power, infrared laser may be directed as by a focusing mirror, providing a focal length which is sufficiently short to produce the irradiance required to produce a laser-supported combustion wave with the assistance of a plasma initiation device. Plasma ignited by a plasma initiation device is sustained by the high power laser but is prevented from propagating up the laser beam by an opposing flow of gas. The opposing flow of gas is generated by passing gas through a pipe which is coaxial with the laser beam. The position of the plasma along the beam axis and the plasma temperature are controlled by the velocity of the gas flow. As the gas velocity is increased, the plasma is forced to retreat into the higher intensity regions of the converging laser beam, wherein it absorbs more energy from the beam and therefore reaches higher temperatures. By using a variety of different gases, vapors, or finely-divided particulates, the physical and chemical characteristics of the plasma may be changed, as desired.

BRIEF DESCRIPTION OF THE DRAWING

The single FIGURE is a diagrammatic, preferred embodiment of the laser plasmatron.

DESCRIPTION OF THE PREFERRED EMBODIMENT

Referring now to the single FIGURE, wherein a preferred embodiment of the laser plasmatron is disclosed a continuous wave, high power laser 1 is disclosed for directing a beam of laser light to a focusing mirror 2, which collects the laser radiation and focuses it to an irradiance high enough to initiate and maintain a plasma. A means for initiating the plasma is placed at the focal point of the focusing mirror 2. Typical of such initiating means is a pair of electrodes 3 for producing an electrical spark discharge to initiate the plasma, and which are withdrawn once the plasma is ignited. Other techniques, such as a metal plate, or a spark produced by the focused beam of a second, small, pulsed laser may be used as is well known to those skilled in the art. After initiation, the plasma tends to propagate up the laser beam away from the higher intensity regions. Adapted between the focusing mirror 2 and the plane of the plasma initiator is a gas flow device 4, which is coaxial with the laser beam and which directs a flow of gas counter to the propagation of the plasma. A toroidal gas manifold 6 is circumferentially disposed around one end of the gas flow device, with nozzles 7 around the circumference thereof directing gas flow into the chamber 8 of gas flow device 4 for providing a controllable velocity of gas into the chamber in the direction of the laser beam which exits the chamber at exit port 9. Typically gas may be introduced into the gas manifold through a gas inlet port 10 such as from a pressurized container or directly from the atmosphere through a pressurizing chamber as is well established in prior art. The velocity of the gas issuing from the gas flow device is controlled by the input pressure to the gas flow device and thereby controls the position and temperature of the plasma within the laser beam. Gas flow is uniformly through chamber 8 in the direction of the laser beam, restraining motion of the plasma toward the laser source. A window 5, transparent to the laser radiation, is optionally disposed adjacent manifold 6 for use in those instances where ingestion of gas by the gas flow device from the surrounding atmosphere is unacceptable.

Typically, with 150 KW of continuous wave $CO_2$ laser power in a 20 centimeter diameter beam incident on a 30 cm diameter concave mirror having a focal length of 8 meters, the laser beam is focused at the focal plane of the mirror on a 1 cm thick aluminum plate. With the exit plane of the gas flow device placed 34 centimeters from the target, the plasma stabilizes about 20 centimeters from the target. The air velocity at the plasma is $1 \times 10^3$ cm/sec and the average laser intensity is at approximately 24 kilowatts per square centimeter.

The use of a highly focused continuous wave laser results in the plasma tending to propagate away from the higher intensity regions of the focused beam. The plasma tends to stabilize at a location where the radiation intensity of the beam is the minimum required to maintain the plasma. This results in a very much reduced plasma temperature from that obtainable by maintaining the plasma at the focal point of the beam.

Further, the amount of radiation absorbed by the plasma from the laser beam is also reduced. By introducing the air or gas flow coaxial with the laser beam in the direction of the laser beam, the plasma may be forced to stay in a relatively high intensity region of the beam, thereby, maintaining the plasma at a higher temperature and resulting in more energy for radiation being absorbed by the plasma. Thus, selectable higher plasma temperatures may be directly controlled by increasing or decreasing the velocity of the gas flow exhausting from port 9 of gas flow device 4. Physical and chemical characteristics of the plasma may be changed by introducing a different gas into the gas flow device or by introducing vapors and/or finely-divided particulates. For example, the gas employed may be any from the group of atomic, molecular, or vapor gases such as xenon, argon, hydrogen or mercury vapor. Particulates which may be added include those used with an RF generated plasma such as finely-divided aluminum oxide as employed in prior art flame-spraying.

Although a particular embodiment and form of this invention has been illustrated, it is obvious to those skilled in the art that modifications may be made without departing from the scope and spirit of the foregoing disclosure. Therefore, it is understood that the invention is limited only by the claims appended hereto.

I claim:

1. A plasma generator comprising: a continuous wave, high power laser, focusing means for focusing radiation of said laser to an irradiance high enough to sustain a plasma, means for igniting said plasma, gas flow means adapted for directing gas at a controllable, variable velocity in the direction of and uniformly dispersed within said laser beam, said laser beam being coaxial with the flow of gas, and wherein said gas flow restrains plasma motion up the laser beam in response to the variation in gas velocity for controlling plasma temperature and position in the laser beam.

2. A plasma generator as set forth in claim 1 wherein the gas employed in the gas flow device may be any from the group of atomic, molecular, or vapor gases.

3. A plasma generator as set forth in claim 1 wherein said gas contains added particulates.

4. A method for controlling the position of a plasma in a laser beam for controlling the irradiance of the plasma by the beam and the temperature range of the plasma and comprising the steps of:
   directing a high energy laser beam through a gas flow device to a focal plane;
   flowing gas coaxially with said laser beam uniformly through said gas-flow device;
   initiating a plasma in said laser beam at said focal plane;
   maintaining laser beam radiation at an intensity to sustain said plasma; and
   varying the velocity of said gas flow to restrain motion of said plasma toward the laser source.

5. A method for controlling the position of plasma as set forth in claim 4 and further comprising the steps of selectably increasing the velocity of gas flow to force the plasma toward the laser focal plane and thereby increase the plasma temperature; and decreasing the velocity of gas flow to allow plasma motion up the beam and a resultant decrease in plasma temperature.

* * * * *